US012051041B2

(12) United States Patent
Zagorin et al.

(10) Patent No.: US 12,051,041 B2
(45) Date of Patent: Jul. 30, 2024

(54) PROCUREMENT MODELING SYSTEM FOR PREDICTING PRICE REASONABLENESS

(71) Applicant: Arkestro Inc., San Francisco, CA (US)

(72) Inventors: Edmund Adam Zagorin, San Francisco, CA (US); Benjamin Kingsland Leiken, Venice, CA (US); Eric David Buras, Denver, CO (US)

(73) Assignee: ARKESTRO INC., San Francisco, CA (US)

( * ) Notice: Subject to any disclaimer, the term of this patent is extended or adjusted under 35 U.S.C. 154(b) by 0 days.

(21) Appl. No.: 17/976,661

(22) Filed: Oct. 28, 2022

(65) Prior Publication Data

US 2024/0144171 A1 May 2, 2024

(51) Int. Cl.
*G06Q 10/087* (2023.01)
*G06Q 30/0283* (2023.01)

(52) U.S. Cl.
CPC ....... *G06Q 10/087* (2013.01); *G06Q 30/0283* (2013.01)

(58) Field of Classification Search
CPC ........... G06Q 30/0206; G06Q 30/0605; G06Q 30/0611; G06Q 30/0617; G06Q 30/08;
(Continued)

(56) References Cited

U.S. PATENT DOCUMENTS 7,272,579 B1 * 9/2007 Canali .................... G06Q 30/08 705/37
11,106,751 B1 8/2021 Kadayam et al.
(Continued)

FOREIGN PATENT DOCUMENTS

CN 106504015 A 3/2017
WO WO-2022238823 A1 * 11/2022 ......... G06Q 30/0283
WO 2024092128 A1 5/2024

OTHER PUBLICATIONS

U.S. Appl. No. 17/976,659, filed Oct. 28, 2022, for Edmund Adam Adam Zagorin et al. (U.S. Patent Application is not submitted herewith pursuant to the waiver of 37 C.F.R. § 1.98(a)(2)(iii) issued by the Office on orSep. 21, 2004.).

(Continued)

*Primary Examiner* — Fahd A Obeid
*Assistant Examiner* — Avia Salman
(74) *Attorney, Agent, or Firm* — MORRISON & FOERSTER LLP

(57) ABSTRACT

A method implemented by computer servers associated with a procurement services platform includes accessing data for a set of transactions associated with a potential procurement transaction between a purchaser entity and a plurality of supplier entities. The transactions include a line-item. The method includes inputting the data for the set of transactions into a machine-learning model trained to generate a prediction of a price quotation for each of the plurality of supplier entities based on the line-item. The prediction of the price quotation includes an estimated reasonable price for a supplier entity to supply a product or service to the purchaser entity. The method includes generating, by the machine-learning model, the prediction of the price quotation for each of the plurality of supplier entities and generating a recommendation for each of the plurality of supplier entities based on the prediction of the price quotation.

19 Claims, 8 Drawing Sheets

(58) Field of Classification Search
CPC . G06Q 50/188; G06Q 10/087; G06Q 30/0283
See application file for complete search history.

(56) References Cited

U.S. PATENT DOCUMENTS

| | | | |
|---|---|---|---|
| 2004/0044624 | A1 | 3/2004 | Katou et al. |
| 2008/0208616 | A1 | 8/2008 | Young |
| 2019/0244268 | A1 | 8/2019 | Zagorin |
| 2019/0392512 | A1 | 12/2019 | Zagorin et al. |
| 2020/0279219 | A1 | 9/2020 | Desai et al. |
| 2020/0302359 | A1 | 9/2020 | Jose et al. |
| 2021/0158236 | A1 | 5/2021 | Bikumala et al. |
| 2022/0391821 | A1 | 12/2022 | Boyd et al. |

OTHER PUBLICATIONS

Non-Final Office Action, dated Apr. 6, 2023, for U.S. Appl. No. 17/976,659, filed Oct. 28, 2022, 22 pages.
Restriction Requirement, dated Feb. 17, 2023, for U.S. Appl. No. 17/976,659, filed Oct. 28, 2022, 10 pages.
Final Office Action, mailed Aug. 10, 2023, for U.S. Appl. No. 17/976,659, filed Oct. 28, 2022, 22 pages.
Non-Final Office Action, mailed Dec. 12, 2023, for U.S. Appl. No. 17/976,659, filed Oct. 28, 2022, 23 pages.
International Search Report and Written Opinion of the International Searching Authority, mailed Dec. 20, 2023, for PCT Application No. PCT/US2023/077919, filed Oct. 26, 2023, 28 pages.

* cited by examiner

PROCUREMENT MODELING SYSTEM FOR PREDICTING PRICE REASONABLENESS

TECHNICAL FIELD

This application relates generally to a procurement modeling system, and, more particularly, to a procurement modeling system for predicting price reasonableness for procuring a product or service by a purchaser entity.

BACKGROUND

Procurement services may generally include software for aiding purchaser entities to purchase and procure requisite products or services from one or more supplier entities for purposes of doing business. In many procurement transactions, a purchaser entity's paramount concern may be to ensure that the price to be paid for the requisite products and services is reasonable and/or cost-effective for its business. Thus, in many instances, a purchaser entity may rely upon complex spreadsheets or other legacy bookkeeping applications to manually perform price reasonableness analyses of, for example, one or more proposed quotes received by a purchaser entity. For example, the price reasonableness analysis may include a review and examination of each price quote proposed by respective supplier entities and a determination as to whether the proposed price quotes are reasonable to the purchaser entity. However, such price reasonableness analyses may typically be based on either incomplete or nonspecific transaction data. For example, in some instances, the actual price paid by the purchaser entity to procure requisite products or services may not be learned until after a report is created based on receipts of already completed procurements. Additionally, such reports typically include an aggregate of the price paid by the purchaser entity for one or more procurements, as opposed to, for example, a line-item breakdown of costs associated with one or more products or services. It may be useful to provide techniques to improve price reasonableness analyses.

SUMMARY

Embodiments of the present disclosure are directed toward a procurement modeling system including one or more computer servers for predicting price reasonableness for procuring a product or service by a purchaser entity. In certain embodiments, the one or more computer servers may access data for a set of transactions associated with a potential procurement transaction between a purchaser entity and at least one of a plurality of supplier entities. In one embodiment, at least one of the transactions includes a line-item. In certain embodiments, the set of transactions may include a line-item and an identification of the purchaser entity. In one embodiment, the line-item may include one or more of a price of the product or service, a quantity of the product or service, or a unit of measure (UOM) with respect to the product or service. In certain embodiments, the one or more computer servers may input the data for the set of transactions into a machine-learning model trained to generate a prediction of a price quotation for each of the plurality of supplier entities based on the line-item. In one embodiment, the prediction of the price quotation may include an estimated reasonable price for a supplier entity of the plurality of supplier entities to supply a product or service to the purchaser entity, in which the product or service corresponding to the line-item.

In certain embodiments, the one or more computer servers may then generate, by the machine-learning model, the prediction of the price quotation for each of the plurality of supplier entities. In some embodiments, generating the prediction of the price quotation for each of the plurality of supplier entities may include generating a respective price quotation for each of the plurality of suppliers. In certain embodiments, the one or more computer servers may then generate a recommendation for each of the plurality of supplier entities based on the prediction of the price quotation. In some embodiments, the one or more computer servers may provide the recommendation to each of the plurality of supplier entities. In some embodiments, the one or more computer servers may cause one or more electronic devices associated with the plurality of supplier entities to display the recommendation.

In some embodiments, the machine-learning model comprises a gradient boosting model, an adaptive boosting (AdaBoost) model, an eXtreme gradient boosting (XGBoost) model, a light gradient boosted machine (LightGBM) model, or a categorical boosting (CatBoost) model. In some embodiments, prior to inputting the data for the set of transactions into the machine-learning model, the one or more computer servers may train the machine-learning model based on historical data for a set of transactions. In some embodiments, the historical data for the set of transactions may include one or more of an identification of the plurality of supplier entities, a plurality of price quotations, or line-item master data.

In certain embodiments, the one or more computer servers may receive a requisition for the potential procurement transaction. In certain embodiments, the one or more computer servers may determine, by the machine-learning model, a prediction of an approvability of the requisition based on one or more characteristics of the requisition. In certain embodiments, the one or more computer servers may generate a recommendation for the purchaser entity based on the prediction of the approvability of the requisition. In certain embodiments, the one or more computer servers may generate, by the machine-learning model, a prediction of a purchasing process for the purchaser entity, the prediction of the purchasing process being generated to execute the potential procurement transaction at the reasonable price. In certain embodiments, subsequent to executing the potential procurement transaction at the reasonable price, the one or more computer servers may determine, by the machine-learning model, one or more anomalies based on the procurement transaction or the set of transactions.

Indeed, the present techniques of providing a procurement modeling system including one or more computer servers for predicting price reasonableness for procuring a product or service by a purchaser entity may provide technical improvements to previous or existing procurement-related cloud-computing based platforms. For example, in accordance with the presently disclosed techniques, the procurement modeling system may provide technical improvements to previous or existing procurement-related cloud-computing based platforms by increasing processing speeds of data processors and reducing database queries by indexing and organizing entities of data and manages data in a predetermined structured manner, such that a number of queries to the database in order to surface desired data is reduced as compared to performing a brute-force search of all of the entities of data stored in the database. For example, in accordance with the presently disclosed embodiments, the procurement modeling system may utilize one or machine-learning models to surface and generate desired data including, for example, one or more of a reasonable price quotation, an approvability of a price quote, a requisition, a purchase order, or a contract, a procurement process to procure products or services at the reasonable price quotation, or exceptions or anomalies included in price quote, a requisition, a purchase order, or a contract.

DESCRIPTION OF EXAMPLE EMBODIMENTS

Figure 1:
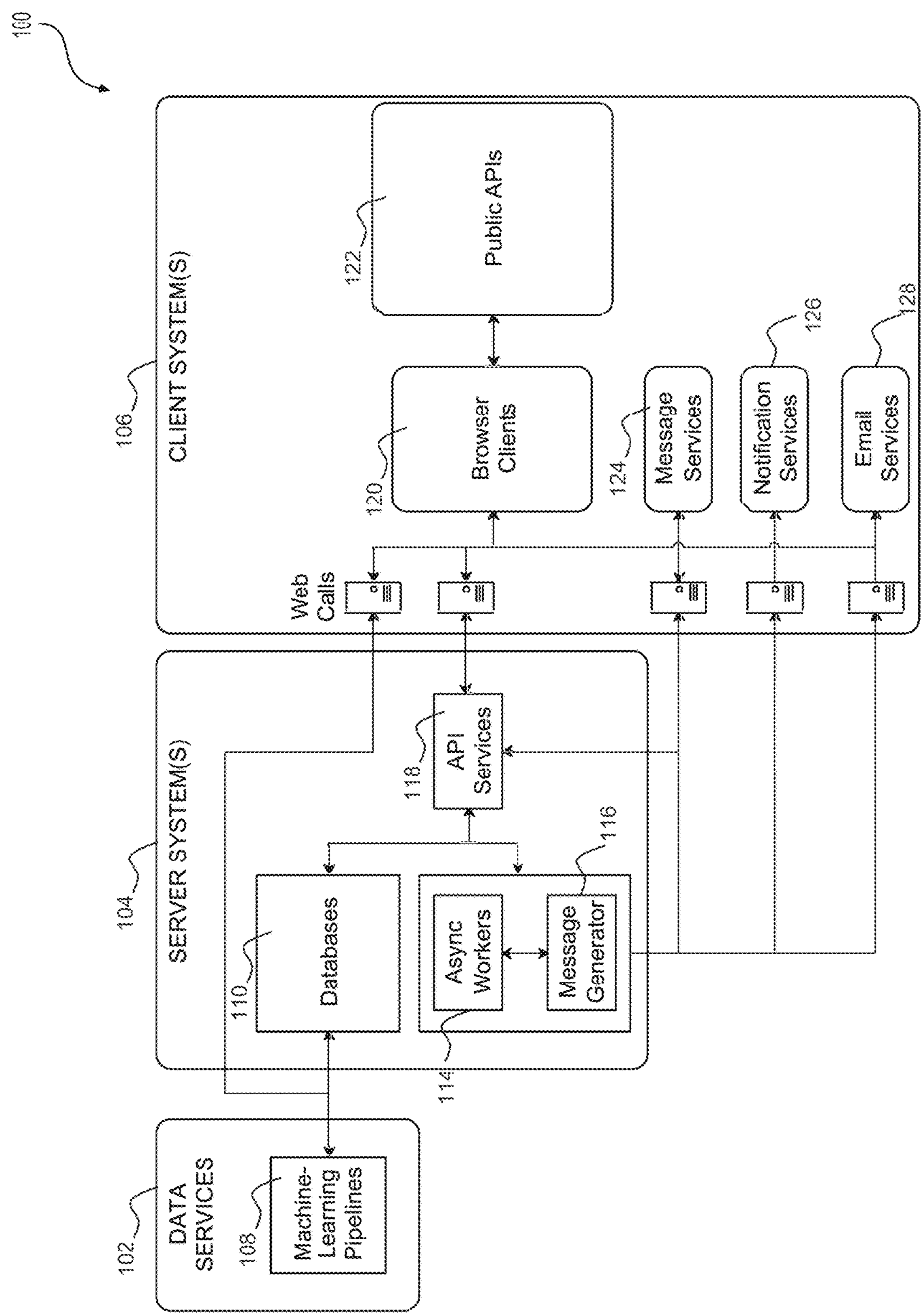
FIG. 1 illustrates an embodiment of a procurement modeling system and network environment.

FIG. 1 illustrates a procurement modeling system and network environment 100 that may be utilized for predicting price reasonableness for procuring a product or service by a purchaser entity, in accordance with the presently disclosed embodiments. As depicted, in certain embodiments, the procurement modeling system and network environment 100 may include a data services system 102, a server system 104, and one or more client systems 106. In certain embodiments, the data services system 102 may include a predictive procurement orchestration (PPO) system, which may include one or more machine-learning model pipelines 108 for predicting price reasonableness for procuring a product or service by a purchaser entity, for example. Indeed, as will be described in greater detail below with respect to FIGS. 2-6, in accordance with the presently disclosed embodiments, the one or more machine-learning model pipelines 108 may be utilized to predict price reasonableness for procuring a product or service by a purchaser entity by, for example, predicting a price quotation for procuring the product or service by the purchaser entity, predicting an approvability of a requisition, purchase order, or a price quote for the purchaser entity, predicting a purchasing process for the purchaser entity, and determining one or more exceptions or anomalies of a procurement transaction for the purchaser entity.

In certain embodiments, the data services system 102 may be stored to one or more databases 112 and hosted and executed utilizing the server system 104. For example, in one embodiment, the server system 104 may include a Platform as a Service (PaaS), a Software as a Service (SaaS), a Compute as a Service (CaaS), an Infrastructure as a Service (IaaS), a Data as a Service (DaaS), a Database as a Service (DBaaS), or other similar cloud-based computing architecture (e.g., "X" as a Service (XaaS)) that may be suitable for generating and providing procurement recommendations to the one or more client systems 106. In certain embodiments, as further illustrated by FIG. 1, the server system 104 may include one or more asynchronous processing workers 114, a message generator 116, and application programming interface (API) services 118.

For example, in some embodiments, the one or more asynchronous processing workers 114, message generator 116, and API services 118 may operate in conjunction (e.g., in the background) for synchronously or asynchronously providing procurement recommendations to the one or more client systems 106 by way of browser client(s) 120, public APIs 122, messaging services 124, notification services 126, and email services 128. For example, in certain embodiments, the one or more client systems 106 may be associated, for example, with any number of respective purchaser entities, supplier entities, sourcing entities, or other entities that may be included as part of a procurement supply chain to which the procurement recommendations may be provided.

Figure 2:
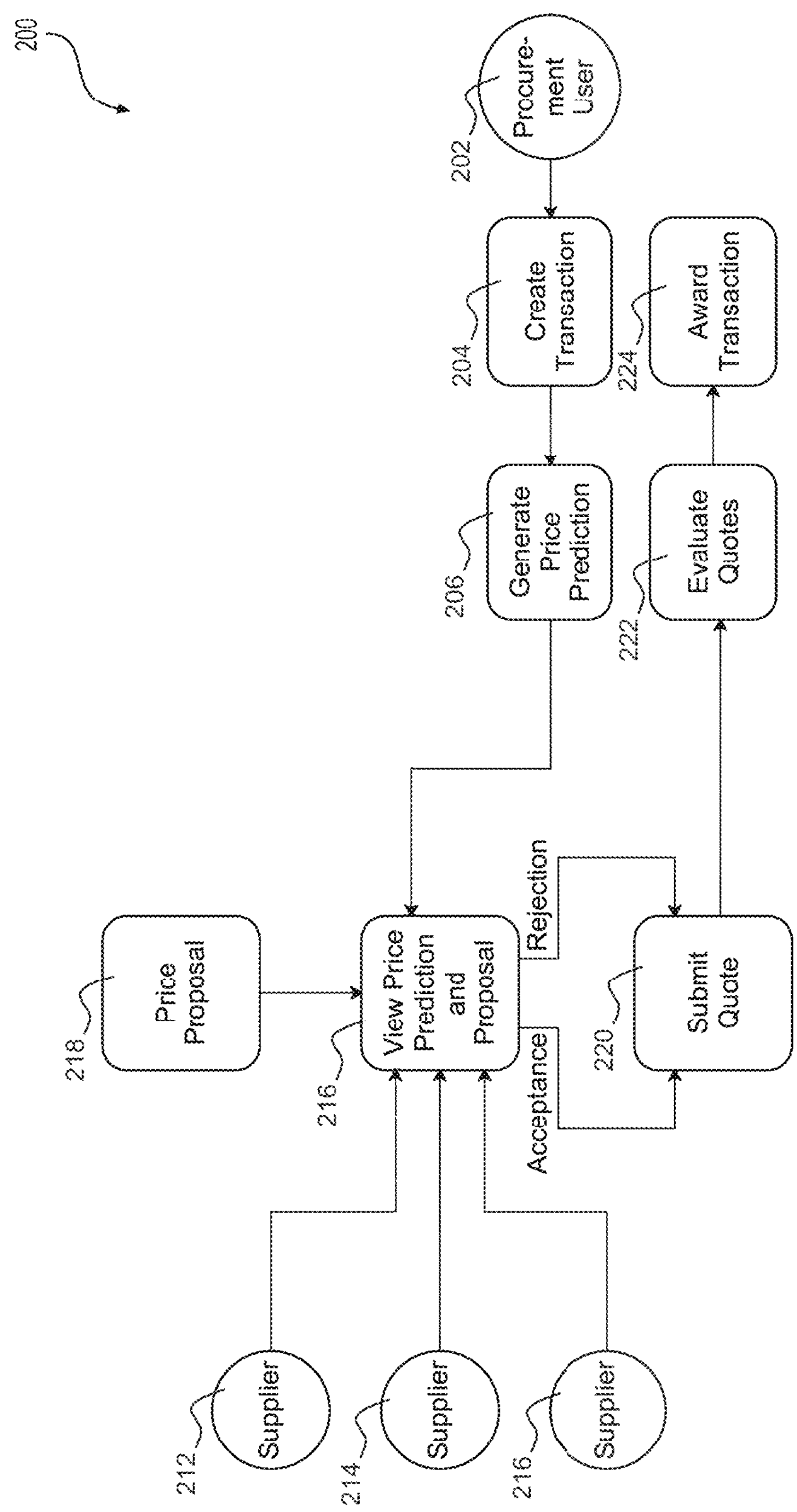
FIG. 2 illustrates an embodiment of a workflow diagram for predicting price reasonableness for procuring a product or service by a purchaser entity.

FIG. 2 illustrates an embodiment of a workflow diagram 200 for predicting price reasonableness for procuring a product or service by a purchaser entity, in accordance with the presently disclosed embodiments. For example, in certain embodiments, the workflow diagram 200 may begin with a procurement entity 202 (e.g., one or more procurement users utilizing one or more of the client systems 106) creating a transaction 204. For example, in one embodiment, the transaction 204 may include a price proposal including one or more line-items. The workflow diagram 200 may then proceed with generating a price prediction 206 based on the transaction 204. For example, in some embodiments, the transaction 204 may be inputted into a machine-learning model (e.g., one or more ensemble-learning based regression models) trained to generate the price prediction 206 for each of a number of different supplier entities 208, 210, and 212.

In certain embodiments, the workflow diagram 200 may proceed with the number of different supplier entities 208, 210, and 212 viewing (216) a price proposal 218 corresponding to the transaction 204. In certain embodiments, the workflow diagram 200 may then proceed with the number of different supplier entities 208, 210, and 212 accepting (e.g., "ACCEPTANCE") or rejecting (e.g., "REJECTION") the proposed price by submitting and/or resubmitting a quote 220 based on the price prediction 206. In certain embodiments, the workflow diagram 200 may then continue with the purchaser entity 202 evaluating one or more quotes 222 and awarding a transaction 224.

Figure 3:
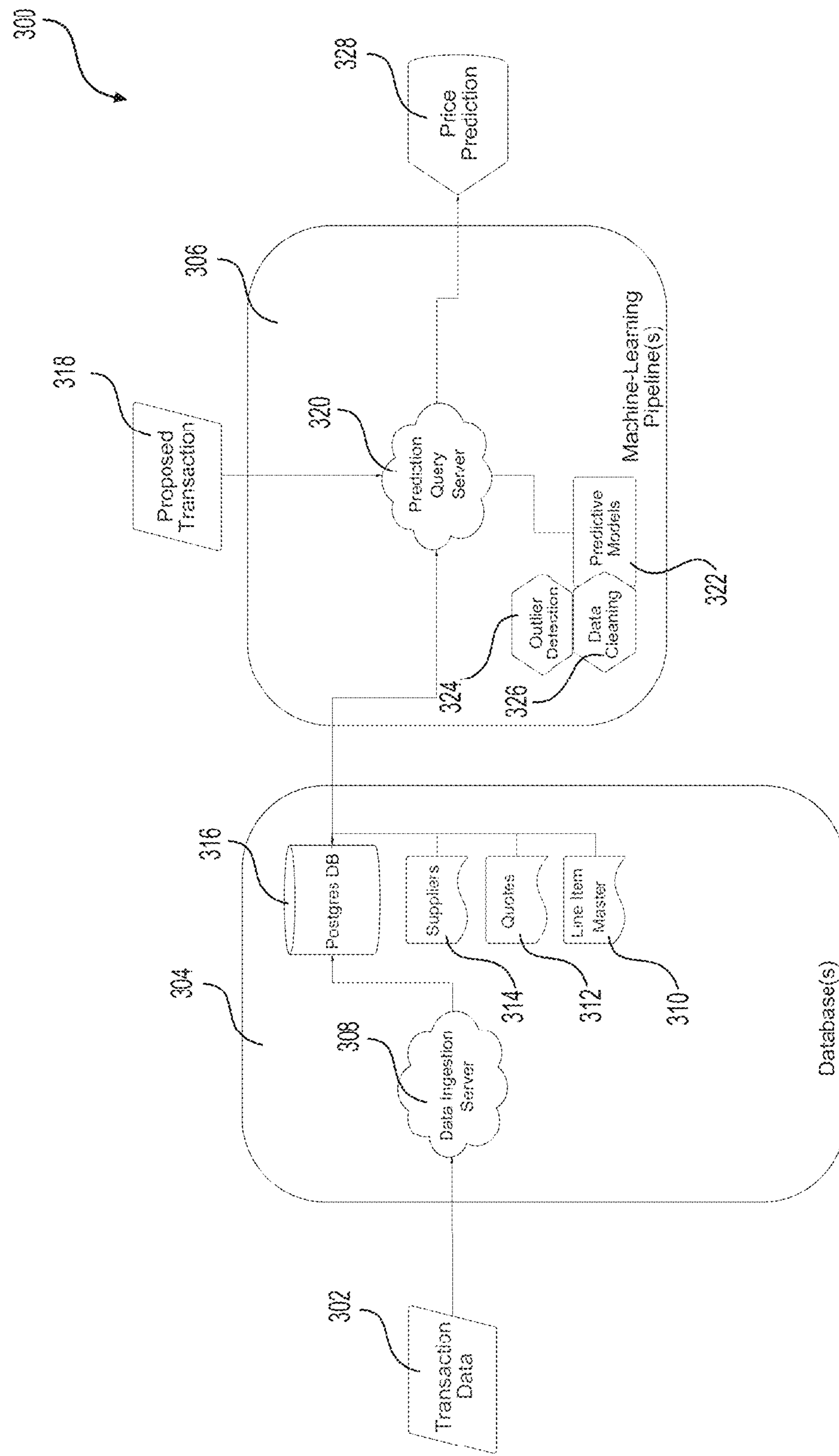
FIG. 3 illustrates an embodiment of a procurement modeling system for predicting a price quotation for procuring a product or service by a purchaser entity.

FIG. 3 illustrates an embodiment of a procurement modeling system 300 for predicting a price quotation for procuring a product or service by a purchaser entity, in accordance with the presently disclosed embodiments. For example, as illustrated by FIG. 3, the procurement modeling system 300 may include one or more database(s) 304 and one or more machine-learning model pipelines 306. In certain embodiments, during the training phase of the one or more machine-learning model pipelines 304, for example, a data ingestion server 308 of the one or more database(s) 304 may receive transaction data 302 (e.g., historical transaction data collected from any number of various purchaser entities or supplier entities over some period of time). For example, in some embodiments, the transaction data 302 may include historical line-item data including, for example, prices of products or services previously procured, quantities of the products or services previously procured, units of measure (UOM) with respect to the products or services previously procured, and so forth.

In certain embodiments, as further depicted by FIG. 3, the transaction data 302 may be stored to a relational database 316 (e.g., PostgreSQL or other similar object-relational database (ORD)) suitable for storing the transaction data 302 along with supplier data attributes 310, price quotes data attributes 312, and line-item master data 314. For example, in certain embodiments, the supplier data attributes 310 may include, for example, an identification of supplier entities, a specific company name for supplier entities, geographical location of supplier entities, an identification of key supplier entities, an identification of valuable supplier entities, and so forth. Similarly, in certain embodiments, the price quotes data attributes 312 may include, for example, line-item data including an identification of a particular product or service, a price of the particular product or service, a quantity of the particular product or service, a UOM with respect to the particular product or service, a currency utilized to purchase the particular product or service, an identification of the purchaser entity associated with the particular product or service, a line-item identification associated with the particular product or service, a category identification associated with the particular product or service, and a supplier entity identification associated with the particular product or service.

In certain embodiments, the line-item master data 314 may include, for example, a catalog or data log of all of the information that may be associated with products or services regularly, intermittently, or previously purchased by a particular purchaser entity, and may further include an identification of the purchaser entity, a description of the products or services identified by item-line, a category identification associated with the products or services, and so forth. In certain embodiments, the transaction data 302 along with supplier data attributes 310, price quotes data attributes 312, and line-item master data 314 stored to the relational database 316 (e.g., PostgreSQL, ORD) may be utilized to train the one or more machine-learning model pipelines 304, and particularly one or more predictive procurement models 322. For example, in some embodiments, the one or more predictive procurement models 322 may include an ensemble-learning based regression model, such as a gradient boosting model, an adaptive boosting (AdaBoost) model, an eXtreme gradient boosting (XGBoost) model, a light gradient boosted machine (LightGBM) model, a categorical boosting (CatBoost) model, or a random forest model.

For example, in certain embodiments, the transaction data 302 and the supplier data attributes 310, price quotes data attributes 312, and line-item master data 314 stored to the relational database 316 (e.g., PostgreSQL, ORD) may be accessed. In certain embodiments, before the transaction data 302 and the supplier data attributes 310, price quotes data attributes 312, and line-item master data 314 are inputted to the one or more predictive procurement models 322 for training the one or more predictive procurement models 322 to predict a price quotation for procuring a product or service by a purchaser entity, these data may be passed to an outlier detector 324 and a data cleaner 326 that may be utilized to removed anomalous line item prices (e.g., baseline prices) and outliers (e.g., edge-case prices) to avoid potentially overfitting the one or more predictive procurement models 322.

In certain embodiments, the transaction data 302 and the supplier data attributes 310, price quotes data attributes 312, and line-item master data 314 may be then inputted to the one or more predictive procurement models 322, which may be iteratively trained to generate predictions of price quotations (e.g., based on training data at a line-item level of granularity as generally discussed above) for procuring particular products or services at a reasonable price. For example, as further illustrated by the procurement modeling system 300 of FIG. 3, once trained, the one or more predictive procurement models 322 may receive a newly proposed transaction 318 (e.g., corresponding to one or more price quotes received by a purchaser entity in real-time or near real-time) by way of a prediction query server 320. For example, as previously noted, the proposed transaction 318 may include line-item data for one or more particular products or services being potentially procured by a purchaser entity.

In certain embodiments, based on the line-item data included in the proposed transaction 318, the one or more predictive procurement models 322 may then generate a prediction of a price quotation 328 (e.g., an estimated reasonable price) for procuring the one or more particular products or services corresponding to the line-item data included in the proposed transaction 318. For example, in some embodiments, the prediction of the price quotation 328 (e.g., an estimated reasonable price) may include a respective recommendation that may be provided to each of a number of respective supplier entities. Specifically, the prediction of the price quotation 328 (e.g., an estimated reasonable price) may include, for example, a respective reasonable price that each of the number of respective supplier entities is expected to propose to the purchaser entity for procuring one or more particular products or services.

Figure 4:
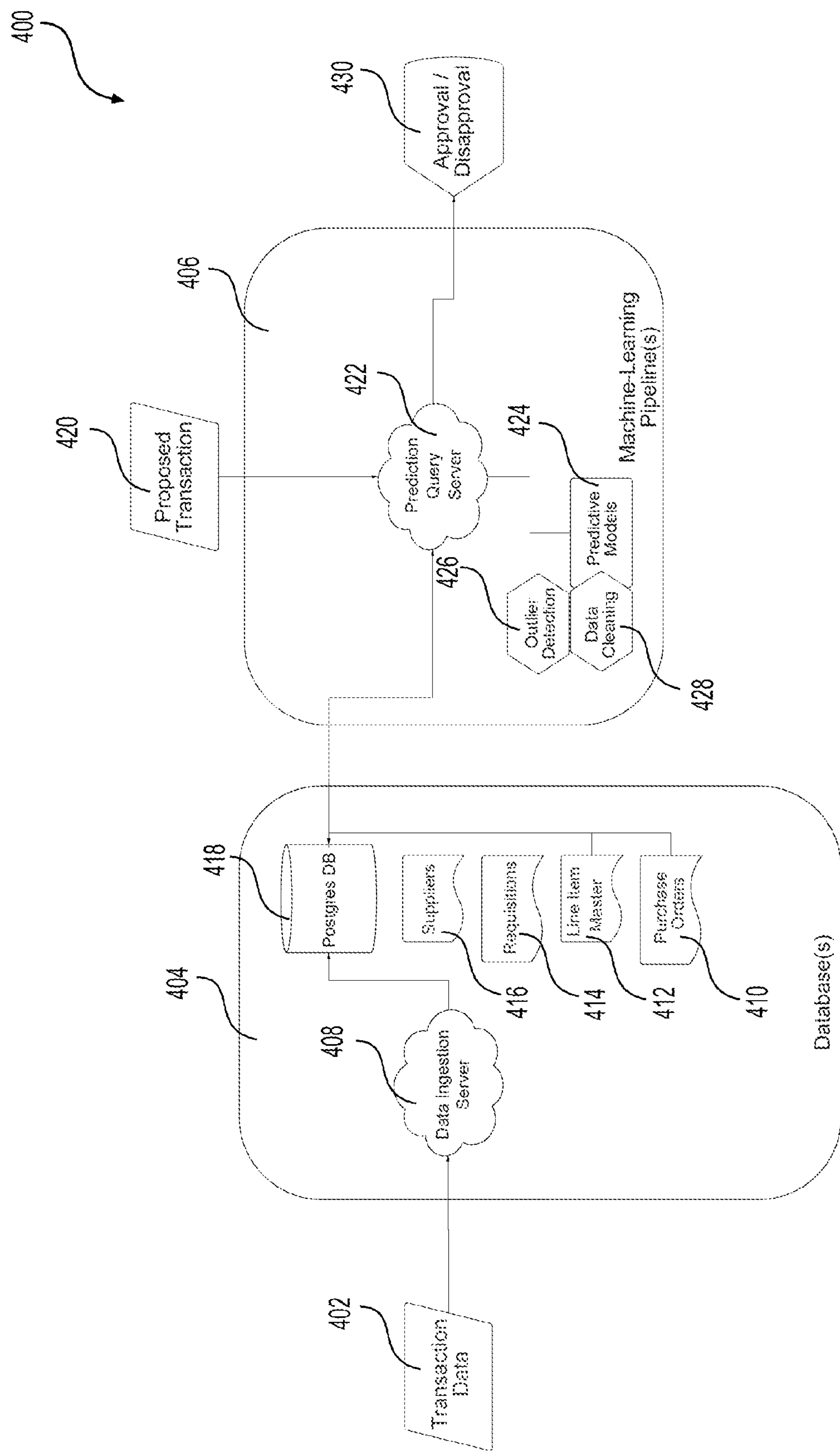
FIG. 4 illustrates an embodiment of a procurement modeling for predicting an approvability of a requisition for a purchaser entity.

FIG. 4 illustrates an embodiment of a procurement modeling system 400 for predicting an approvability of a requisition, a purchase order, or a price quote for a purchaser entity, in accordance with the presently disclosed embodiments. For example, as illustrated by FIG. 4, the procurement modeling system 400 may include one or more database(s) 404 and one or more machine-learning model pipelines 406. In certain embodiments, during the training phase of the one or more machine-learning model pipelines 404, for example, a data ingestion server 408 of the one or more database(s) 404 may receive transaction data 402 (e.g., historical transaction data collected from any number of various purchaser entities or supplier entities over some period of time). For example, in some embodiments, the transaction data 402 may include historical line-item data including, for example, prices of products or services previously procured, quantities of the products or services previously procured, UOM with respect to the products or services previously procured, and so forth.

In certain embodiments, as further depicted by FIG. 4, the transaction data 408 may be stored to a relational database 416 (e.g., PostgreSQL or other similar ORD)) suitable for storing the transaction data 408 along with purchaser orders data attributes 410, line-item master data 412, requisitions data attributes 414, and supplier data attributes 416. For example, in certain embodiments, purchaser orders data attributes 410 may include any information that may be included, for example, in purchase orders generated by various purchaser entities once prices for a certain number of products or services have been agreed upon between the purchaser entity and associated supplier entities. For example, in one embodiment, the purchaser orders data attributes 410 may include, for example, a date of an order of the products or services, address location of the supplier entities, shipping information associated the products or services and/or the supplier entities, discount terms that may be associated with the products or services, an identification of the supplier entities, an identification of the purchaser entity, a description of the products or services identified by item-line, an identification of the purchaser order (e.g., PO number), and so forth.

Similarly, in some embodiments, the line-item master data 412 may include, for example, a catalog or data log of all of the information that may be associated with products or services regularly, intermittently, or previously purchased by a particular purchaser entity, and may further include an identification of the purchaser entity, a description of the products or services identified by item-line, a category identification associated with the products or services, and so forth. In certain embodiments, the requisitions data attributes 414 may include any information that may be included, for example, in requisitions generated by various purchaser entities for internal record-keeping and/or accounting with respect to any products or services ordered or to be ordered.

For example, in one embodiment, the requisitions data attributes 414 may include, for example, an identification of the products or services ordered or to be ordered, a price of the products or services ordered or to be ordered, a quantity of the products or services ordered or to be ordered, a UOM with respect to the products or services ordered or to be ordered, a currency utilized purchase or price the products or services ordered or to be ordered, an identification of the purchaser entity, a date of the order for the products or services, an identification of a line-item associated with the products or services ordered or to be ordered, an identification of a category for the products or services ordered or to be ordered, and an identification of the supplier entities. In certain embodiments, the supplier data attributes 416 may include, for example, an identification of supplier entities, a specific company name for supplier entities, geographical location of supplier entities, an identification of key supplier entities, an identification of valuable supplier entities, and so forth.

In certain embodiments, the transaction data 408 along with the purchaser orders data attributes 410, the line-item master data 412, the requisitions data attributes 414, and the supplier data attributes 416 stored to the relational database 418 (e.g., PostgreSQ or other similar ORD) may be utilized to train the one or more machine-learning model pipelines 404, and particularly one or more predictive procurement models 424. For example, in some embodiments, the one or more predictive procurement models 424 may include an ensemble-learning based regression model, such as a gradient boosting model, an AdaBoost model, an XGBoost model, a LightGBM model, a CatBoost model, or a random forest model.

For example, in certain embodiments, the transaction data 408 along with the purchaser orders data attributes 410, the line-item master data 412, the requisitions data attributes 414, and the supplier data attributes 416 stored to the relational database 418 stored to the relational database 418 may be accessed. In certain embodiments, before the transaction data 408 and the purchaser orders data attributes 410, the line-item master data 412, the requisitions data attributes 414, and the supplier data attributes 416 are inputted to the one or more predictive procurement models 424 for training the one or more predictive procurement models 424 to predict a price quotation for procuring a product or service by a purchaser entity, these data may be passed to an outlier detector 426 and a data cleaner 428 that may be utilized to remove anomalous line item data and outliers (e.g., edge-cases) to avoid potentially overfitting the one or more predictive procurement models 424.

In certain embodiments, the transaction data 404 and the purchaser orders data attributes 410, the line-item master data 412, the requisitions data attributes 414, and the supplier data attributes 416 may be then inputted to the one or more predictive procurement models 424, which may be iteratively trained to generate predictions of an approval and/or disapproval of a purchase order or requisition (e.g., based on training data at a line-item level of granularity as generally discussed above) for procuring particular products or services at a reasonable price. For example, as further illustrated by the procurement modeling system 400 of FIG. 4, once trained, the one or more predictive procurement models 424 may receive a newly proposed transaction 420 (e.g., corresponding to one or more purchaser orders or requisitions received by a purchaser entity in real-time or near real-time) by way of a prediction query server 422.

For example, as previously noted, the proposed transaction 420 may include line-item data in a requisition, a purchase order, or a price quote for one or more particular products or services being potentially procured by a purchaser entity. In certain embodiments, based on the line-item data included in the proposed transaction 420, the one or more predictive procurement models 424 may then generate a prediction of an approval and/or disapproval 430 for the purchase order, requisition, or price quote corresponding to the proposed transaction 420. For example, in some embodiments, the prediction of an approval and/or disapproval 430 may include a recommendation of whether the purchaser entity should accept or reject the purchase order, requisition, or price quote. Specifically, the prediction of an approval and/or disapproval 430 may include, for example, a recommendation that is provided to the purchaser entity of whether to accept or reject the purchase order, requisition, or price quote received from one or more supplier entities.

Figure 5:
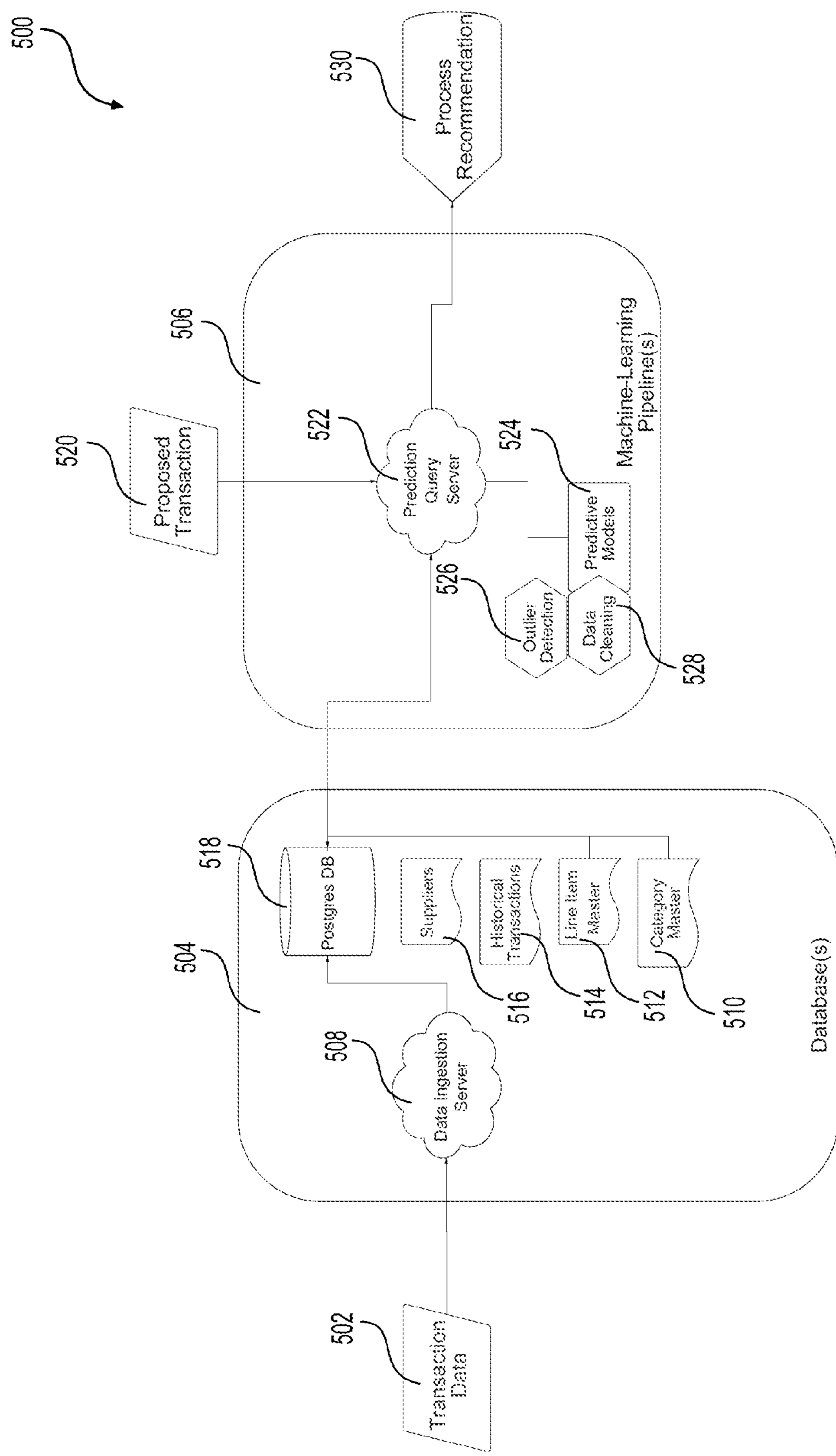
FIG. 5 illustrates an embodiment of a procurement modeling system for predicting a purchasing process for a purchaser entity.

FIG. 5 illustrates an embodiment of a procurement modeling system 500 for predicting a purchasing process for a purchaser entity, in accordance with the presently disclosed embodiments. For example, as illustrated by FIG. 5, the procurement modeling system 500 may include one or more database(s) 504 and one or more machine-learning model pipelines 506. In certain embodiments, during the training phase of the one or more machine-learning model pipelines 506, for example, a data ingestion server 508 of the one or more database(s) 504 may receive transaction data 502 (e.g., historical transaction data collected from any number of various purchaser entities or supplier entities over some period of time). For example, in some embodiments, the transaction data 502 may include historical line-item data including, for example, prices of products or services previously procured, quantities of the products or services previously procured, UOM with respect to the products or services previously procured, and so forth.

In certain embodiments, as further depicted by FIG. 5, the transaction data 502 may be stored to a relational database 518 (e.g., PostgreSQL or other similar ORD)) suitable for storing the transaction data 502 along with category master data 510, line-item master data 512, historical transactions data attributes 514, and supplier data attributes 516. For example, in certain embodiments, the supplier data attributes 516 may include, for example, an identification of supplier entities, a specific company name for supplier entities, geographical location of supplier entities, an identification of key supplier entities, an identification of valuable supplier entities, and so forth. In certain embodiments, the line-item master data 512 may include, for example, a catalog or data log of all of the information that may be associated with products or services regularly, intermittently, or previously purchased by a particular purchaser entity, and may further include an identification of the purchaser entity, a description of the products or services identified by item-line, a category identification associated with the products or services, and so forth. Similarly, in certain embodiments, the historical transactions data attributes 514 may include, for example, line-item data derived from one or more historical data sets of requisitions, invoices, purchase orders, price quotes, sourcing events, and so forth.

For example, in some embodiments, the historical transactions data attributes 514 may include an identification of products or services included in the historical transaction data, a price of the product or services included in the historical transactions data, a quantity of the products or services in the historical transactions data, a UOM with respect to the products or services included in the historical transactions data, a currency utilized to purchase the products or services included in the historical transactions data, an identification of the purchaser entity associated with the products or services included in the historical transactions data, a line-item identification associated with the products or services included in the historical transactions data, a category identification associated with the products or services included in the historical transactions data, a supplier entity identification associated with the products or services included in the historical transactions data, a number of the requisitions, invoices, purchase orders, or sourcing events included in the historical transactions data, and a duration associated with the requisitions, invoices, purchase orders, or sourcing events included in the historical transactions data.

In certain embodiments, the category master data 510 may include an identification category, a description category, one or more naming categories, or a parent identification category that may be associated with supplier entities, purchaser entities, and/or one or more particular products or services. In certain embodiments, the transaction data 502 along with the category master data 510, the line-item master data 512, the historical transactions data attributes 514, and the supplier data attributes 516 stored to the relational database 518 (e.g., PostgreSQL, ORD) may be utilized to train the one or more machine-learning model pipelines 506, and particularly one or more predictive procurement models 524. For example, in some embodiments, the one or more predictive procurement models 524 may include an ensemble-learning based regression model, such as a gradient boosting model, an AdaBoost model, an XGBoost model, a LightGBM model, a CatBoost model, or a random forest model.

For example, in certain embodiments, the category master data 510, the line-item master data 512, the historical transactions data attributes 514, and the supplier data attributes 516 stored to the relational database 518 (e.g., PostgreSQL, ORD) may be accessed. In certain embodiments, before the transaction data 502 and the category master data 510, the line-item master data 512, the historical transactions data attributes 514, and the supplier data attributes 516 are inputted to the one or more predictive procurement models 524 for training the one or more predictive procurement models 524 to generate a prediction of a purchasing process for a purchaser entity for procuring a product or service at a reasonable price, these data may be passed to an outlier detector 526 and a data cleaner 528 that may be utilized to removed anomalous line item prices (e.g., baseline prices) and outliers (e.g., edge-case prices) to avoid potentially overfitting the one or more predictive procurement models 524.

In certain embodiments, the category master data 510, the line-item master data 512, the historical transactions data attributes 514, and the supplier data attributes 516 may be then inputted to the one or more predictive procurement models 524, which may be iteratively trained to generate predictions of purchasing processes for procuring particular products or services at a reasonable price (e.g., the predicted price quotation 328 as described above with respect to FIG. 3). For example, as further illustrated by the procurement modeling system 500 of FIG. 5, once trained, the one or more predictive procurement models 524 may receive a newly proposed transaction 520 (e.g., corresponding to one or more price quotes received by a purchaser entity in real-time or near real-time) by way of a prediction query server 522.

For example, as previously noted, the proposed transaction 520 may include line-item data for one or more particular products or services being potentially procured by a purchaser entity. In certain embodiments, based on the line-item data included in the proposed transaction 520, the one or more predictive procurement models 524 may then generate a prediction of the purchasing process 530, which may include a recommendation of a prescribed course of negotiation or procurement in which a purchaser entity should follow in order to procure the one or more particular products or services corresponding to the line-item data included in the proposed transaction 520 at a reasonable price (e.g., the predicted price quotation 328 as described above with respect to FIG. 3). In one embodiment, the prediction of the purchasing process 530 may include, for example, a recommendation provided to a purchaser entity regarding the procurement process that is to be used to evaluate the reasonableness of proposed price.

Figure 6:
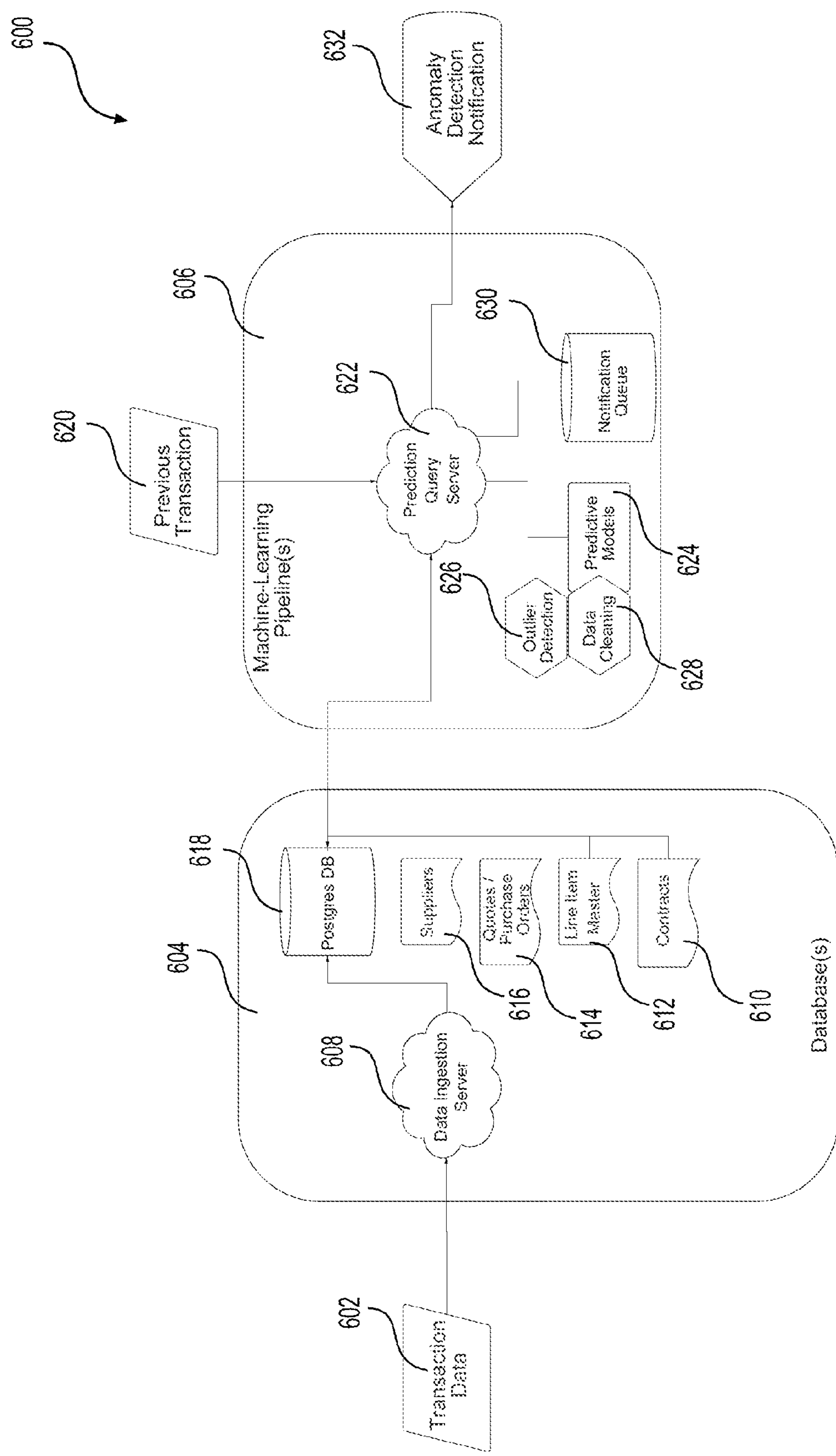
FIG. 6 illustrates an embodiment of a procurement modeling system for determining one or more anomalies of a procurement transaction for a purchaser entity.

FIG. 6 illustrates an embodiment of a procurement modeling system 600 for determining one or more anomalies of a procurement transaction for a purchaser entity, in accordance with the presently disclosed embodiments. For example, as illustrated by FIG. 6, the procurement modeling system 600 may include one or more database(s) 604 and one or more machine-learning model pipelines 606. In certain embodiments, during the training phase of the one or more machine-learning model pipelines 606, for example, a data ingestion server 608 of the one or more database(s) 604 may receive transaction data 602 (e.g., historical transaction data collected from any number of various purchaser entities or supplier entities over some period of time). For example, in some embodiments, the transaction data 602 may include historical line-item data including, for example, prices of products or services previously procured, quantities of the products or services previously procured, UOM with respect to the products or services previously procured, and so forth.

In certain embodiments, as further depicted by FIG. 6, the transaction data 602 may be stored to a relational database 618 (e.g., PostgreSQL or other similar ORD)) suitable for storing the transaction data 602 along with contracts data attributes 610, line-item master data 612, price quotes or purchase orders data attributes 614, and supplier data attributes 616. For example, in certain embodiments, the supplier data attributes 616 may include, for example, an identification of supplier entities, a specific company name for supplier entities, geographical location of supplier entities, an identification of key supplier entities, an identification of valuable supplier entities, and so forth. In certain embodiments, the line-item master data 612 may include, for example, a catalog or data log of all of the information that may be associated with products or services regularly, intermittently, or previously purchased by a particular purchaser entity, and may further include an identification of the purchaser entity, a description of the products or services identified by item-line, a category identification associated with the products or services, and so forth.

In certain embodiments, the price quotes or purchase orders data attributes 614 may include, for example, line-item data including an identification of a particular product or service, a price of the particular product or service, a quantity of the particular product or service, a UOM with respect to the particular product or service, a currency utilized to purchase the particular product or service, an identification of the purchaser entity associated with the particular product or service, a line-item identification associated with the particular product or service, a category identification associated with the particular product or service, and a supplier entity identification associated with the particular product or service. In certain embodiments, the contracts data attributes 610 may include, for example, line-item data including a line-item identification associated with a particular product or service, a price of the particular product or service, a quantity of the particular product or service, a UOM with respect to the particular product or service, a currency utilized to purchase the particular product or service, a start date of a contract, a license, a warranty, and so forth, an expiration date of a contract, a license, a warranty, and so forth.

In certain embodiments, the transaction data 602 along with the contracts data attributes 610, the line-item master data 612, the price quotes or purchase orders data attributes 614, and the supplier data attributes 616 stored to the relational database 618 (e.g., PostgreSQL, ORD) may be utilized to train the one or more machine-learning model pipelines 606, and particularly one or more predictive procurement models 624. For example, in some embodiments, the one or more predictive procurement models 624 may include an ensemble-learning based regression model, such as a gradient boosting model, an AdaBoost model, an XGBoost model, a LightGBM model, a CatBoost model, or a random forest model.

For example, in certain embodiments, the contracts data attributes 610, the line-item master data 612, the price quotes or purchase orders data attributes 614, and the supplier data attributes 616 stored to the relational database 618 (e.g., PostgreSQL, ORD) may be accessed. In certain embodiments, before the transaction data 602 and the contracts data attributes 610, the line-item master data 612, the price quotes or purchase orders data attributes 614, and the supplier data attributes 616 are inputted to the one or more predictive procurement models 624 for training the one or more predictive procurement models 624 to generate a prediction of one or more exceptions or anomalies, these data may be passed to an outlier detector 626 and a data cleaner 628 that may be utilized to removed anomalous line item prices (e.g., baseline prices) and outliers (e.g., edge-case prices) to avoid potentially overfitting the one or more predictive procurement models 624.

In certain embodiments, the contracts data attributes 610, the line-item master data 612, the price quotes or purchase orders data attributes 614, and the supplier data attributes 616 may be then inputted to the one or more predictive procurement models 624, which may be iteratively trained to generate predictions of one or more exceptions or anomalies (e.g., the anomalies or exceptions may be detected before ever appearing in a potential purchase order or may be detected in a purchase order for products or services previously procured by a purchaser entity). For example, as further illustrated by the procurement modeling system 600 of FIG. 6, once trained, the one or more predictive procurement models 624 may receive a previous transaction 620 by way of a prediction query server 622.

For example, the previous transaction 620 may include line-item data for one or more particular products or services being potentially procured by a purchaser entity or a purchase order for products or services previously procured by the purchaser entity. In certain embodiments, based on the line-item data included in the previous transaction 620, the one or more predictive procurement models 624 may then detect one or more exceptions or anomalies 632, which may include a recommendation generated by a notification queue 630. Specifically, in some embodiments, the detected one or more exceptions or anomalies 632 may include, for example, a recommendation with respect to one or more risk signals or exceptions regarding prices included in the previous transaction 620. In one embodiment, the recommendation may be provided to, for example, a financial controller or other similar accounting professional that may be associated with a purchaser entity.

Figure 7:
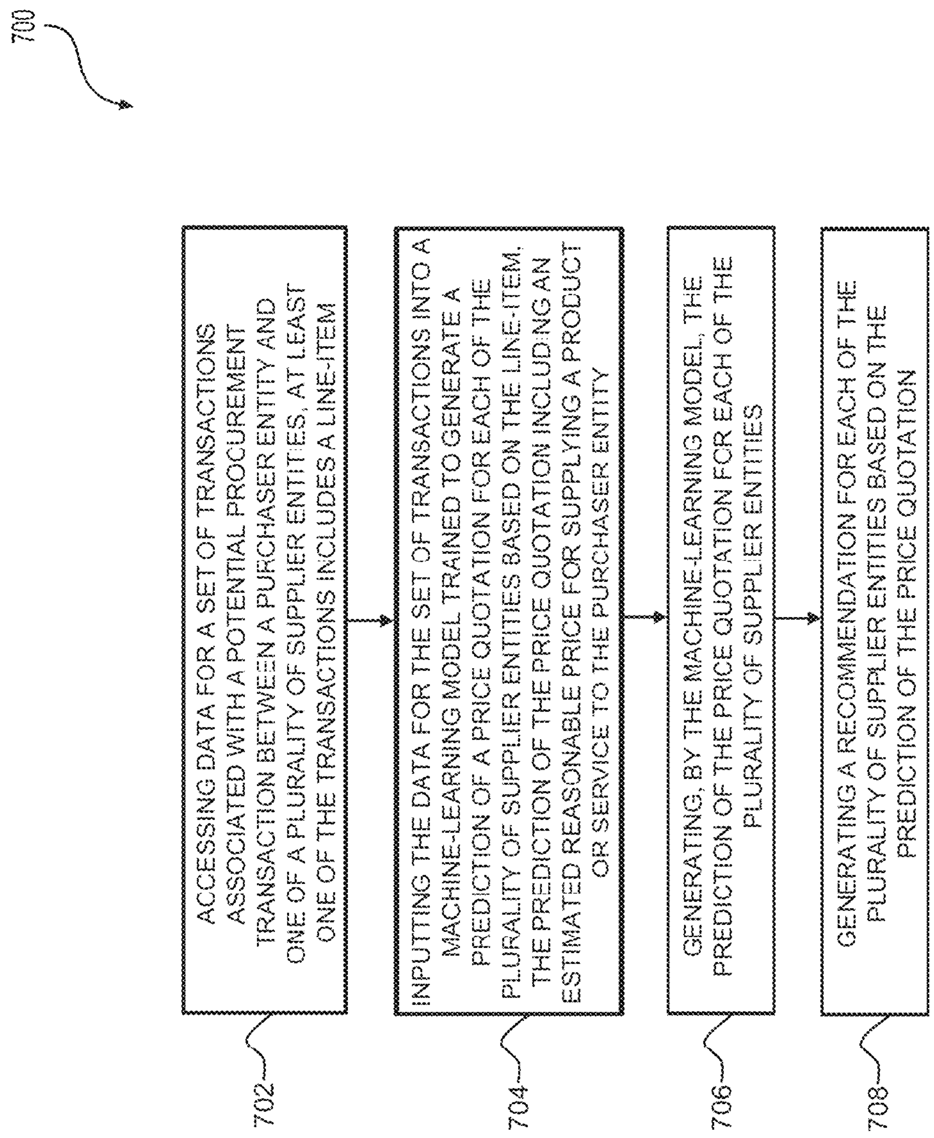
FIG. 7 illustrates a flow diagram of a method for predicting a price quotation for procuring a product or service by a purchaser entity.

FIG. 7 illustrates a flow diagram of a method 700 for predicting a price quotation for procuring a product or service by a purchaser entity, in accordance with the presently disclosed embodiments. The method 700 may be performed utilizing one or more processing devices that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), a deep learning processor (DLP), a tensor processing unit (TPU), neuromorphic processing unit (NPU), a wafer-scale engine (WSE), or any of various hardware artificial intelligence (AI) accelerators) that may be suitable for processing various transactions and making one or more decisions based thereon, software (e.g., instructions running/executing on one or more processing devices), firmware (e.g., microcode), or some combination thereof.

The method 700 may begin at block 702 with one or more processing devices accessing data for a set of transactions associated with a potential procurement transaction between a purchaser entity and at least one of a plurality of supplier entities. For example, at least one transaction of the set of transactions may include a line-item. The method 700 may continue at block 704 with one or more processing devices inputting the data for the set of transactions into a machine-learning model trained to generate a prediction of a price quotation for each of the plurality of supplier entities based on the line-item. For example, the prediction of the price quotation may include an estimated reasonable price for a supplier entity of the plurality of supplier entities to supply a product or service to the purchaser entity, in which the product or service corresponds to the line-item. The method 700 may then continue at block 706 with one or more processing devices generating, by the machine-learning model, the prediction of the price quotation for each of the plurality of supplier entities. The method 700 may then continue at block 708 with one or more processing devices generating a recommendation for each of the plurality of supplier entities based on the prediction of the price quotation.

Figure 8:
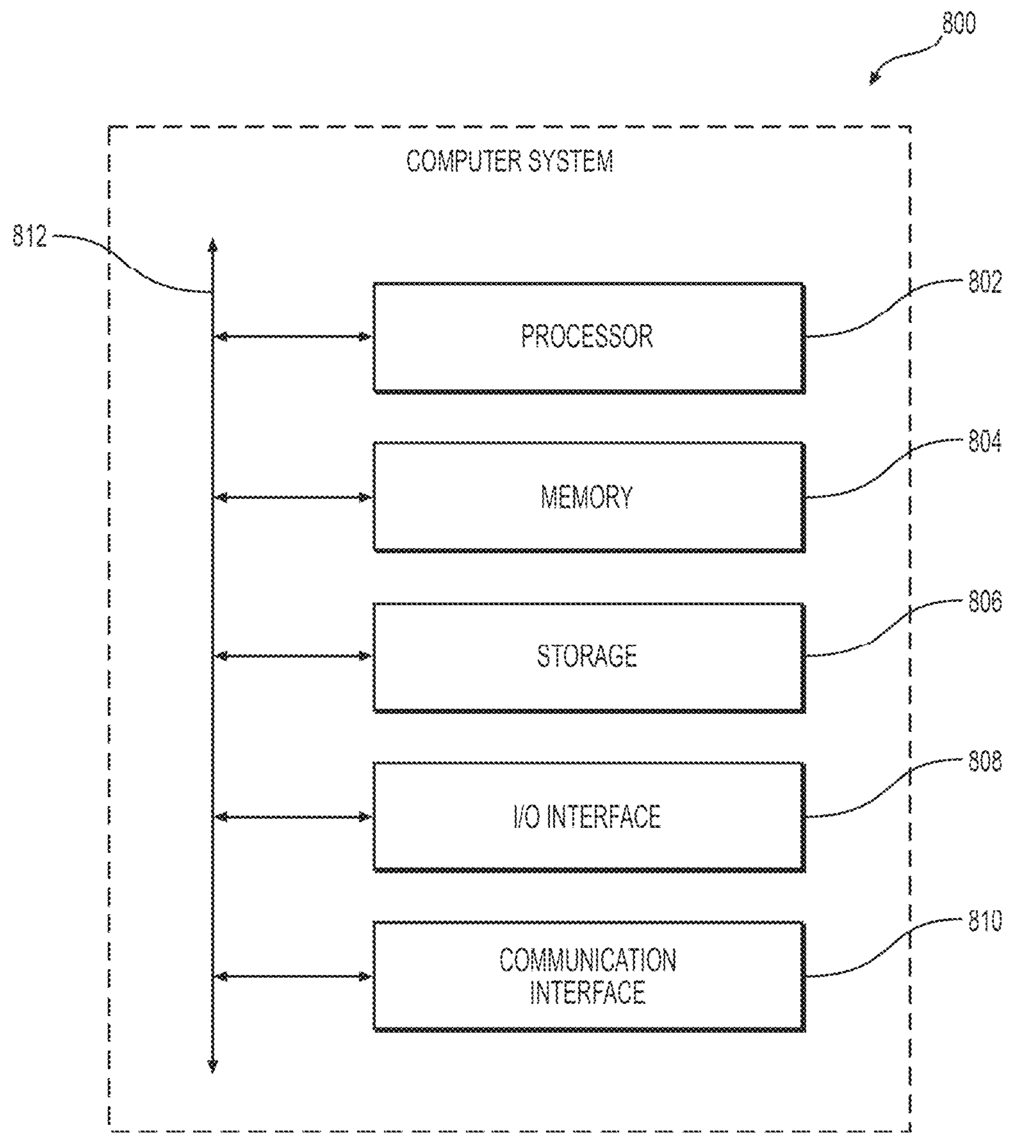
FIG. 8 illustrates an example procurement modeling computing system included as part of the procurement modeling system.

FIG. 8 illustrates an example procurement modeling computing system 800 (which may be included as part of the procurement services platform 102) that may be utilized for predicting price reasonableness for procuring a product or service by a purchaser entity, in accordance with the presently disclosed embodiments. In certain embodiments, one or more financial services computing system 800 perform one or more steps of one or more methods described or illustrated herein. In certain embodiments, one or more financial services computing system 800 provide functionality described or illustrated herein. In certain embodiments, software running on one or more financial services computing system 800 performs one or more steps of one or more methods described or illustrated herein or provides functionality described or illustrated herein. Certain embodiments include one or more portions of one or more procurement modeling computing system 800. Herein, reference to a computer system may encompass a computing device, and vice versa, where appropriate. Moreover, reference to a computer system may encompass one or more computer systems, where appropriate.

This disclosure contemplates any suitable number of financial services computing systems 800. This disclosure contemplates computer system 800 taking any suitable physical form. As example and not by way of limitation, computer system 800 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more financial services computing system 800; be unitary or distributed; span multiple locations; span multiple machines; span multiple data centers; or reside in a cloud, which may include one or more cloud components in one or more networks.

Where appropriate, one or more financial services computing system 800 may perform without substantial spatial or temporal limitation one or more steps of one or more methods described or illustrated herein. As an example, and not by way of limitation, one or more financial services computing system 800 may perform in real time or in batch mode one or more steps of one or more methods described or illustrated herein. One or more financial services computing system 800 may perform at different times or at different locations one or more steps of one or more methods described or illustrated herein, where appropriate.

In certain embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement. In certain embodiments, processor 802 includes hardware for executing instructions, such as those making up a computer program. As an example, and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806.

In certain embodiments, processor 802 may include one or more internal caches for data, instructions, or addresses. This disclosure contemplates processor 802 including any suitable number of any suitable internal caches, where appropriate. As an example, and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802.

Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In certain embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In certain embodiments, memory 804 includes main memory for storing instructions for processor 802 to execute or data for processor 802 to operate on. As an example, and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In certain embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere).

One or more memory buses (which may each include an address bus and a data bus) may couple processor 802 to memory 804. Bus 812 may include one or more memory buses, as described below. In certain embodiments, one or more memory management units (MMUs) reside between processor 802 and memory 804 and facilitate accesses to memory 804 requested by processor 802. In certain embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memory devices 804, where appropriate. Although this disclosure describes and illustrates particular memory, this disclosure contemplates any suitable memory.

In certain embodiments, storage 806 includes mass storage for data or instructions. As an example, and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In certain embodiments, storage 806 is non-volatile, solid-state memory. In certain embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In certain embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 806 for them. Where appropriate, I/O interface 808 may include one or more device or software drivers enabling processor 802 to drive one or more of these I/O devices. I/O interface 808 may include one or more I/O interfaces 806, where appropriate. Although this disclosure describes and illustrates a particular I/O interface, this disclosure contemplates any suitable I/O interface.

In certain embodiments, communication interface 810 includes hardware, software, or both providing one or more interfaces for communication (such as, for example, packet-based communication) between computer system 800 and one or more other computer systems 800 or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it.

As an example, and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In certain embodiments, bus 812 includes hardware, software, or both coupling components of computer system 800 to each other. As an example, and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to this disclosure are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates certain embodiments as providing particular advantages, certain embodiments may provide none, some, or all of these advantages.

What is claimed is:

1. A method for providing machine-learning-based predictions related to a particular line-item, comprising, by one or more computing devices:

receiving, by a data ingestion server, historical transaction data for a set of transactions associated with at least one supplier from a plurality of suppliers storing the historical transaction data in a database, wherein the database further stores data associated with:

a set of attributes of a plurality of line-items associated with the set of transactions, wherein the plurality of line-items comprise one or more line-items other than the particular line-item, wherein each of the plurality of line-items comprises a quantity of a product and a unit of measure with respect to the product, and a set of attributes of the at least one supplier from the plurality of suppliers;

retrieving the historical transaction data, the data associated with the set of attributes of the plurality of line-items, and the data associated with the set of attributes of the at least one supplier from the database as training data;

structuring the training data to avoid overfitting of machine-learning models by:

detecting, by an outlier detector, one or more outlier data items in the retrieved historical transaction data; and removing, by a data cleaner, the one or more outlier data from the retrieved historical transaction data;

training a machine-learning model pipeline based on the training data, wherein the machine-learning model pipeline is trained to generate outputs corresponding to the at least one supplier from the plurality of suppliers;

receiving, by a prediction query server, a user input specifying a potential procurement transaction for the particular line-item between a purchaser and one of the at least one supplier from the plurality of suppliers;

inputting data associated with the user input into the machine-learning model pipeline to generate one or more estimated supplier-specific price quotations corresponding to the at least one supplier;

executing, by the machine-learning model pipeline, the potential procurement transaction at one of the one or more estimated supplier-specific price quotations; and iteratively training the machine-learning model pipeline based on the execution of the potential procurement transaction by the machine-learning model pipeline.

2. The method of claim 1, further comprising providing the one or more estimated supplier-specific price quotations to the at least one supplier.

3. The method of claim 1, wherein the set of transactions comprises the plurality of line-items and an identification of the at least one supplier.

4. The method of claim 1, wherein each of the plurality of line-items comprises one or more of a price of a product or service, a quantity of the product or service, or a unit of measure (UOM) with respect to the product or service.

5. The method of claim 1, further comprising causing one or more electronic devices associated with the at least one supplier to display the one or more estimated supplier-specific price quotations.

6. The method of claim 1, wherein the machine-learning model pipeline comprises a gradient boosting model, an adaptive boosting (AdaBoost) model, an eXtreme gradient boosting (XGBoost) model, a light gradient boosted machine (LightGBM) model, a categorical boosting (CatBoost) model, or a random forest model.

7. The method of claim 1, wherein the historical transaction data for the set of transactions comprises one or more of an identification of the at least one supplier, a plurality of price quotations, or line-item master data.

8. The method of claim 1, wherein generating the one or more estimated supplier-specific price quotations comprises generating a respective price quotation for each of the at least one supplier.

9. The method of claim 1, further comprising:

receiving a requisition for the potential procurement transaction;

determining, by the machine-learning model pipeline, a prediction of an approvability of the requisition based on one or more characteristics of the requisition; and generating a recommendation for the purchaser based on the prediction of the approvability of the requisition.

10. The method of claim 1, further comprising:

generating, by the machine-learning model pipeline, a prediction of a purchasing process for the purchaser, the prediction of the purchasing process being generated to execute the potential procurement transaction at the one of the one or more estimated supplier-specific price quotations; and generating a recommendation for the purchaser based on the prediction of the purchasing process.

11. The method of claim 1, further comprising:

subsequent to executing the potential procurement transaction at the one of the one or more estimated supplier-specific price quotations, determining, by the machine-learning model pipeline, one or more anomalies based on the procurement transaction or the set of transactions.

12. A non-transitory computer-readable medium comprising instructions that, when executed by one or more computer servers associated with a procurement services platform, cause the one or more computer servers to:

receive historical transaction data for a set of transactions associated with at least one supplier from a plurality of suppliers;

store the historical transaction data in a database, wherein the database further stores associated with:

a set of attributes of a plurality of line-items associated with the set of transactions, wherein the plurality of line-items comprise one or more line-items other than the particular line-item, wherein each of the plurality of line-items comprises a quantity of a product and a unit of measure with respect to the product, and a set of attributes of the at least one supplier from the plurality of suppliers;

retrieve the historical transaction data, the data associated with the set of attributes of the plurality of line-items, and the data associated with the set of attributes of the at least one supplier from the database as training data;

structuring the training data to avoid overfitting of machine-learning models by:

detecting, by an outlier detector, one or more outlier data items in the retrieved historical transaction data; and removing, by a data cleaner, the one or more outlier data from the retrieved historical transaction data;

train a machine-learning model pipeline based on the training data, wherein the machine-learning model pipeline is trained to generate outputs corresponding to the at least one supplier from the plurality of suppliers;

receive a user input specifying a potential procurement transaction for the particular line-item between a purchaser and one of the at least one supplier from the plurality of suppliers;

input data associated with the user input into the machine-learning model pipeline to generate one or more estimated supplier-specific price quotations corresponding to the at least one supplier;

execute, by the machine-learning model pipeline, the potential procurement transaction at one of the one or more estimated supplier-specific price quotations; and iteratively training the machine-learning model pipeline based on the execution of the potential procurement transaction by the machine-learning model pipeline.

13. The non-transitory computer-readable medium of claim 12, wherein the instructions further comprise instructions to:

receive a requisition for the potential procurement transaction;

determine, by the machine-learning model pipeline, a prediction of an approvability of the requisition based on one or more characteristics of the requisition; and generate a recommendation for the purchaser based on the prediction of the approvability of the requisition.

14. The non-transitory computer-readable medium of claim 12, wherein the instructions further comprise instructions to:

generate, by the machine-learning model pipeline, a prediction of a purchasing process for the purchaser, the prediction of the purchasing process being generated to execute the potential procurement transaction at the one of the one or more estimated supplier-specific price quotations; and generate a recommendation for the purchaser based on the prediction of the purchasing process.

15. The non-transitory computer-readable medium of claim 12, wherein the instructions further comprise instructions to:

subsequent to executing the potential procurement transaction at the one of the one or more estimated supplier-specific price quotations, determine, by the machine-learning model pipeline, one or more anomalies based on the procurement transaction or the set of transactions.

16. A system including one or more computing devices for providing machine-learning-based predictions related to a particular line-item, the one or more computing devices comprising:

one or more non-transitory computer-readable storage media including instructions; and one or more processors coupled to the one or more storage media, the one or more processors configured to execute the instructions to:

receive historical transaction data for a set of transactions associated with at least one supplier from a plurality of suppliers;

store the historical transaction data in a database, wherein the database further stores data associated with:

a set of attributes of a plurality of line-items associated with the set of transactions, wherein the plurality of line-items comprise one or more line-items other than the particular line-item, wherein each of the plurality of line-items comprises a quantity of a product and a unit of measure with respect to the product, and a set of attributes of the at least one supplier from the plurality of suppliers;

retrieve the historical transaction data, the data associated with the set of attributes of the plurality of line-items, and the data associated with the set of attributes of the at least one supplier from the database as training data;

structure the training data to avoid overfitting of machine-learning models by:

detecting, by an outlier detector, one or more outlier data items in the retrieved historical transaction data; and removing, by a data cleaner, the one or more outlier data from the retrieved historical transaction data;

train a machine-learning model pipeline based on the training data, wherein the machine-learning model pipeline is trained to generate outputs corresponding to the at least one supplier from the plurality of suppliers;

receive a user input specifying a potential procurement transaction for the particular line-item between a purchaser and at least one of the at least one supplier from the plurality of suppliers;

input data associated with the user input into the machine-learning model pipeline to generate one or more estimated supplier-specific price quotations corresponding to the at least one supplier;

execute, by the machine-learning model pipeline, the potential procurement transaction at one of the one or more estimated supplier-specific price quotations; and iteratively train the machine-learning model pipeline based on the execution of the potential procurement transaction by the machine-learning model pipeline.

17. The system of claim 16, wherein the instructions further comprise instructions to:

receive a requisition for the potential procurement transaction;

determine, by the machine-learning model pipeline, a prediction of an approvability of the requisition based on one or more characteristics of the requisition; and generate a recommendation for the purchaser based on the prediction of the approvability of the requisition.

18. The system of claim 16, wherein the instructions further comprise instructions to:

generate, by the machine-learning model pipeline, a prediction of a purchasing process for the purchaser, the prediction of the purchasing process being generated to execute the potential procurement transaction at the one of the one or more estimated supplier-specific price quotations; and generate a recommendation for the purchaser based on the prediction of the purchasing process.

19. The system of claim 16, wherein the instructions further comprise instructions to:

subsequent to executing the potential procurement transaction at the one of the one or more estimated supplier-specific price quotations, determine, by the machine-learning model pipeline, one or more anomalies based on the procurement transaction or the set of transactions.

* * * * *